United States Patent
Wong et al.

(10) Patent No.: US 7,959,140 B2
(45) Date of Patent: Jun. 14, 2011

(54) MAGNETIC POSITIONING DEVICE

(76) Inventors: Harry Wong, South Pasadena, CA (US); Daming Zhao, Shanghai (CN)

( * ) Notice: Subject to any disclaimer, the term of this patent is extended or adjusted under 35 U.S.C. 154(b) by 388 days.

(21) Appl. No.: 12/358,512

(22) Filed: Jan. 23, 2009

(65) Prior Publication Data
US 2009/0189324 A1 Jul. 30, 2009

(30) Foreign Application Priority Data
Jan. 25, 2008 (CN) .................. 2008 2 0055121 U

(51) Int. Cl.
*B25B 11/00* (2006.01)
(52) U.S. Cl. ..................... 269/8; 269/3; 269/6
(58) Field of Classification Search .......... 269/8, 3, 269/6, 95
See application file for complete search history.

(56) References Cited

U.S. PATENT DOCUMENTS

| | | | | |
|---|---|---|---|---|
| 2,884,698 A * | 5/1959 | Wursch | ............ | 33/500 |
| 5,971,379 A * | 10/1999 | Leon, Jr. | ............ | 269/8 |
| 6,092,271 A * | 7/2000 | Stojkovic et al. | ............ | 29/281.5 |
| 6,279,885 B1 * | 8/2001 | Leon, Jr. | ............ | 269/8 |
| 6,427,993 B1 * | 8/2002 | Prochac | ............ | 269/37 |
| 6,708,964 B1 * | 3/2004 | Dedrick | ............ | 269/8 |
| 7,648,130 B2 * | 1/2010 | Lancaster-Larocque | ......... | 269/8 |
| 2009/0189324 A1 * | 7/2009 | Wong et al. | ............ | 269/8 |

* cited by examiner

*Primary Examiner* — Lee D Wilson
(74) *Attorney, Agent, or Firm* — Jen-Feng Lee

(57) ABSTRACT

A magnetic positioning device is disclosed and claimed wherein two magnetic arms are hingeably connected by an axle connector with locking bolt and nut, and an activation hole with pin inserting through the connection disks having arc-shaped toothed-groove made the selection of frequently used angles straight-forward and easy, when the pre-select angles are built to the "indents" in the toothed-groove, so that the enlarged head on the pin can be used to easily engaging to the selected angle, by pushing toward the spring located inside the hole on the disk. An optional switch is provided on the second end of the magnetic arm for easy control of the magnetic power direction.

9 Claims, 4 Drawing Sheets

MAGNETIC POSITIONING DEVICE

CLAIM OF FOREIGN PRIORITY, 35 U.S.C. §119

The present invention claims its foreign priority filing, pursuant to the provision of 35 U.S.C. section 119 et seq, based upon the application filed by the same inventors in China, having application number 200820055121.6 filed on Jan. 25, 2008.

FIELD AND BACKGROUND OF THE INVENTION

The present invention relates generally to a positioning device; specifically a device with magnetic attaching power that can be used to position metal work pieces for ease of being worked/operated upon.

Magnetic aligning or positioning tools are widely used for the positioning or aligning of metal work pieces. These tools are mostly made of a single magnetic piece, or two (2) magnetic pieces put together in a certain configuration. Such tools provide a fixed-angle (such as 90-degree fix angle) or adjustable-angle device made from two magnetic pieces hinged together by an axle-connection.

A prior art example of Eclipse Tools' heavy duty variable clamp is provided in FIG. 1, containing the following features: magnetic pieces 11 and 12 are connectably linked by connection axle 3; magnetic plates 121 are embedded to (but not completely submerged into) a surface of magnetic pieces 11/12; positioning arm pieces 112 and 122 are respectively extended from the magnetic pieces 11 and 12, where a groove-slot 1221 is formed on positioning arm piece 122, and where a locking bolt 61 is connected to arm piece 112 (and going through the groove-slot 1221 on arm piece 122), with a locking nut 62 on the other side of arm piece 122 that serves to tighten relative position/angle of arm pieces 112 and 122, after an angle has been selected, as between the work pieces in contact with the magnetic plates 121.

The disadvantages of such prior art device include: in the case where work pieces are big or heavy, locking bolts 61 and nuts 62 tend to loose the tightness as between the two arm pieces 112 and 122, due to continuous weight applied onto the positioning device, resulting in the change of the selected angle. Moreover, when such prior art device is used on work pieces with varied and changing angles, it is both time-consuming and inefficient to set up the positioning/alignment for the work piece angles that are frequently used in the industry. Such disadvantages further lead to random errors when the selection and setting of the frequent angles cannot be obtained quickly.

OBJECTS AND SUMMARY OF THE INVENTION

Present invention provides a technical solution for a magnetic positioning device, whereby the angle-setting can be done quickly and efficiently, for the frequently used angles in the industry.

The implementation of present magnetic position device primarily consists of two magnetic pieces connected by a hinge device which contains a "toothed groove" in addition to the hinge itself, so that it enables easy adjustment of angles, particularly for frequently used angles.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

Figure 1:
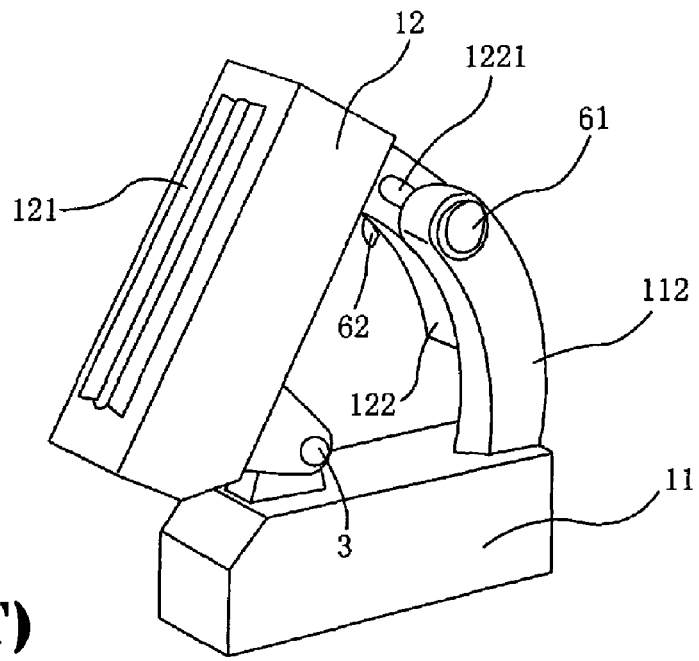
FIG. 1 shows a prior art structural implementation of a heavy duty variable clamp.
Figure 2:
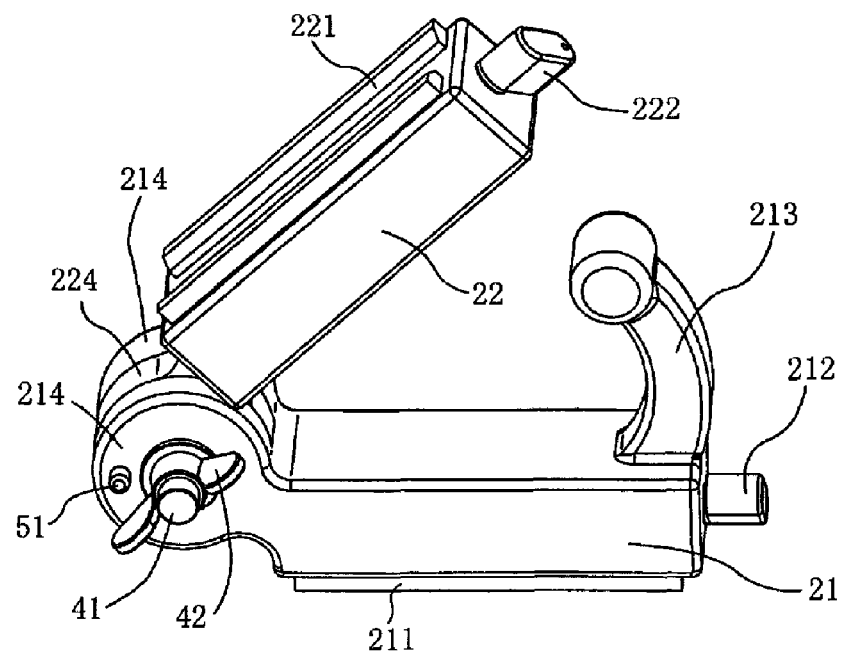
FIG. 2 shows the basic structural implementation of present invention.
Figure 3:
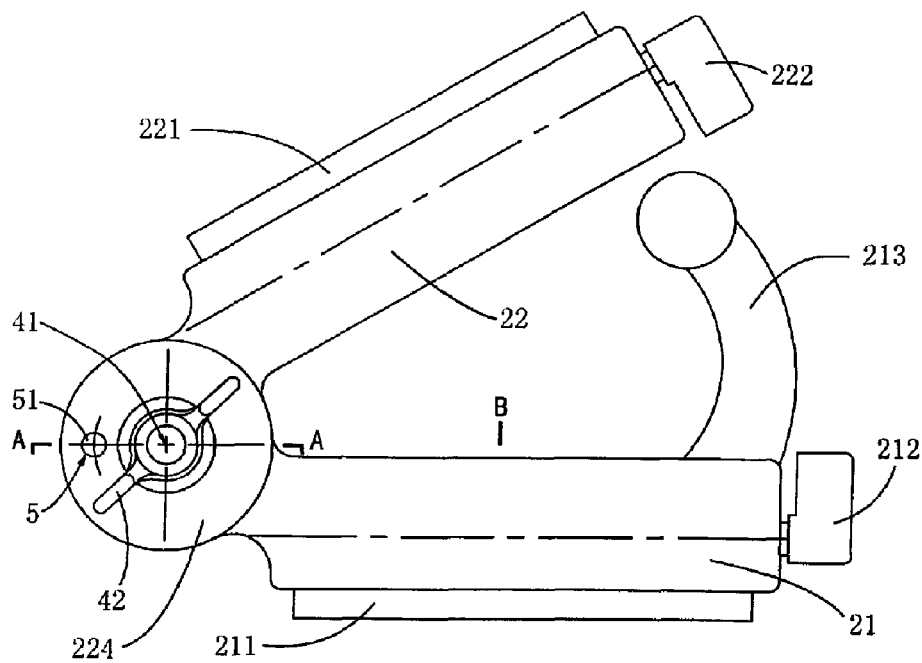
FIG. 3 shows the front view of structural implementation as presented in FIG. 2.

The magnetic positioning/aligning device disclosed herein and as illustrated in FIGS. 2-9, comprised of a first magnetic arm 21 and a second magnetic arm 22, whereby they are connected by an axle connector 4 on the respective first end of the two magnetic arms 21/22.

Said axle connector 4 is further made up of 2 connecting disks 214 formed at said first end of magnetic arm 21 and one connecting disk 224 formed at said first end of magnetic arm 22, so that disk 224 is sandwiched in-between disks 214, wherein a locking bolt 41 and a corresponding locking nut 42 are inserted through the concentric hole of said connection disks and hingeably attached to the two outside surfaces of the said connecting disks 214/224.

Figure 6:
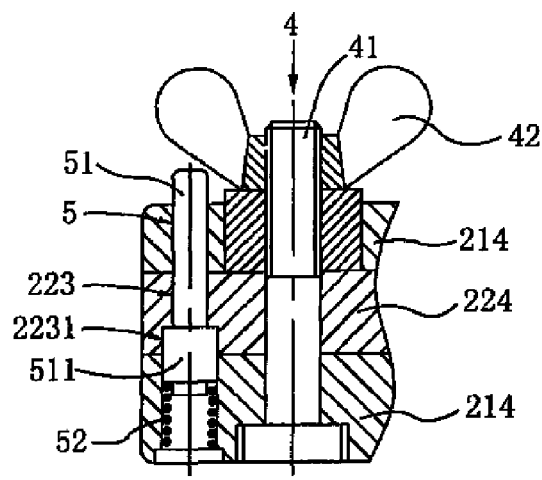
FIG. 6 shows the A-A cutline profile view of FIG. 3.

An activation through-hole 5 is formed on one of the connection disks 214. Another hole, shaped like a cul-de-sac, is formed on the other connection disk 214, so that the cul-de-sac hole contains a spring 52 (detailed later). A toothed-groove 223 is formed on the connection disk 224. Through-hole 5 (and the cul-de-sac hole on the other connection disk) and groove 223 are formed in such a way that a pin 51 (as shown on FIG. 9) is inserted through the hole 5 on disks 214 and the toothed-groove 223 on disk 224 (as shown in FIG. 6), so that disks 214 and disk 224 are rotatably hinged together by the axle connector 4, but with the rotation angle limited by the arc-angle per the toothed-groove 223 formed on connection disk 224.

A handle 213 is optionally formed on the second end (opposing the connection disk end, which is referred to as first end) of magnetic arm 21, for ease of holding on to the positioning device of present invention.

Figure 4:
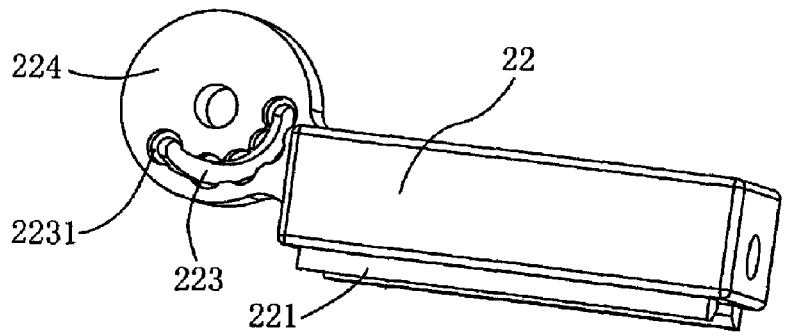
FIG. 4 shows the structural implementation of the second magnetic arm.
Figure 5:
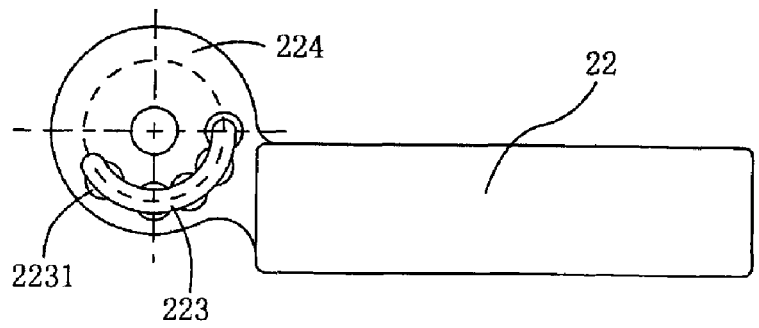
FIG. 5 shows the front view of FIG. 4.

As shown in FIGS. 4 and 5, toothed-groove 223 is a curved groove generally in the shape of an arc having its center of radiation located on the same point as the axle connector 4. The indents 2231 in the toothed-groove 223 will correspond to common angles used in the industry, such as 30, 45, 60, 90, 120, 150, 180 degrees, etc.; that way, pin 51 will be easily "clicked" into any of the selected indents 2231 in toothed-groove 223, according to the commonly selected angles used in the industry.

On the outside (external) surfaces of connection disks 214, markings for the ranges of angle selection can be made for ease of reference.

Referencing FIG. 6, which is a profile view of the axle connector 4 from cutline A-A, the quick-positioning action is achieved by having an enlarged head 511 at one end of pin 51, so that the diameter of enlarged head 511 is sized to fit the inner diameter of each of the indents 2231, forming a snug fit. A spring 52 is located at the end of cul-de-sac hole 5 located in one of the connection disk 214, resiliently keeping the enlarged head 511 to one of the selected indents 2231 at the desired angle.

To change the magnetic positioning device to a different angle, pin 51 is then pushed inwards toward the spring 52, i.e. to the end of the cul-de-sac hole, so that the enlarged head 511 is disengaged from the selected indents 2231, and pin 51 can then move inside the toothed-groove 223 within the arc-angle, thus turning the angle of magnetic arm 21 relative to magnetic arm 22, until a different selected angle is chosen, when the pushing force is then released, allowing the enlarged head 511 to engage to the newly selected indent 2231 again.

Locking bolt 41 and locking nuts 42 can then be easily tightened, ensuring that the selected angle will not be changed, despite heavy load or the gravity of big work pieces.

Figure 7:
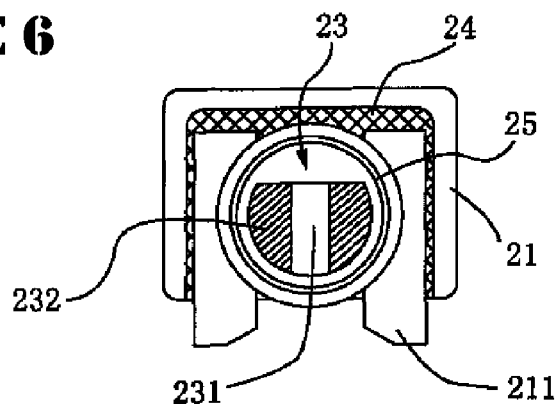
FIG. 7 shows the B-B cutline profile view of FIG. 3.
Figure 8:
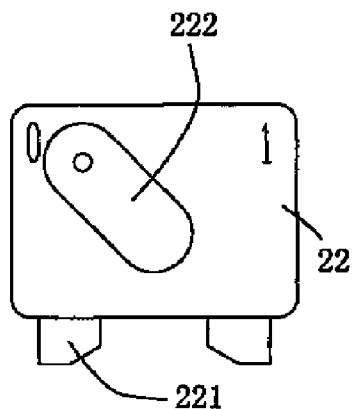
FIG. 8 shows a switch component for the second magnetic arm.
Figure 9:
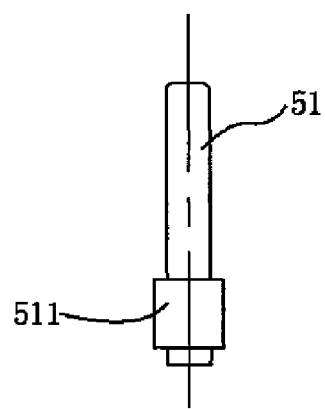
FIG. 9 shows the side view of positioning pin, also shown on the left side of FIG. 6.

As shown in FIGS. 7 and 8, an optional pair of magnetizable plates 211 can be inserted into magnetic arm 21, wherein a non-magnetic aluminum sheath 25 is set in between the two plates 211, and serves to keep the two plates' relative position. Inside said aluminum sheath 25 is a magnetic piece 23 made up by a center magnetic steel piece 231 and two flanking non-magnetic round steel pieces 232. Some amount of industrial glue 24 is used to attach the plates (and the inlaid sheath 25) inside the chamber space of the magnetic arm 21.

By such use of optional magnetizable plates 211, a controllable exposed magnetic surface is made for easy attachment to and disengagement from magnetic work pieces. A switch 222 is built to the second end of magnetic arm 22, opposing the end of the axle connector 4. By turning the switch 222, the magnetic steel piece 231 of the magnetic piece 23 changes its directional power of the magnetic field, further resulting in the magnetic strength of the plates 211, thus allowing the users to easily control how the positioning device will be used for attaching to or disengaging from magnetic work pieces.

On the other magnetic arm 22, corresponding magnetizable plates 211 along with the sheath 25 (and the 23, 231 and 232 components) can be similarly built in.

Figure 10:
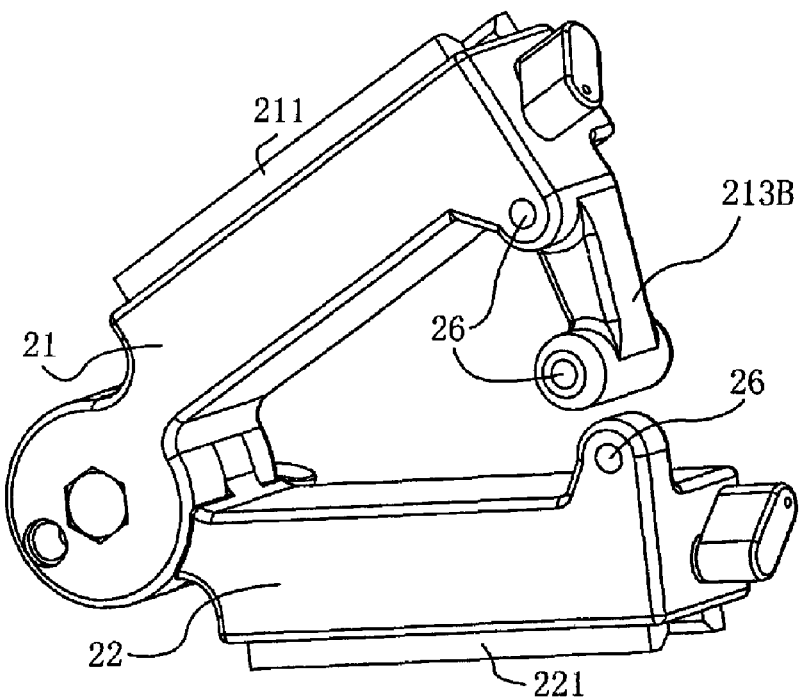
FIG. 10 shows a further embodiment of present invention.

A further embodiment of present invention is shown in FIG. 10, where an auxiliary hole 26 is made to the handle 213B and the corresponding second end the other magnetic arm. Said auxiliary hole 26 may contain thread lines, so that external clamping tools or measuring tools, such as rulers or angle measures, can be used in conjunction with present invention.

Figure 11:
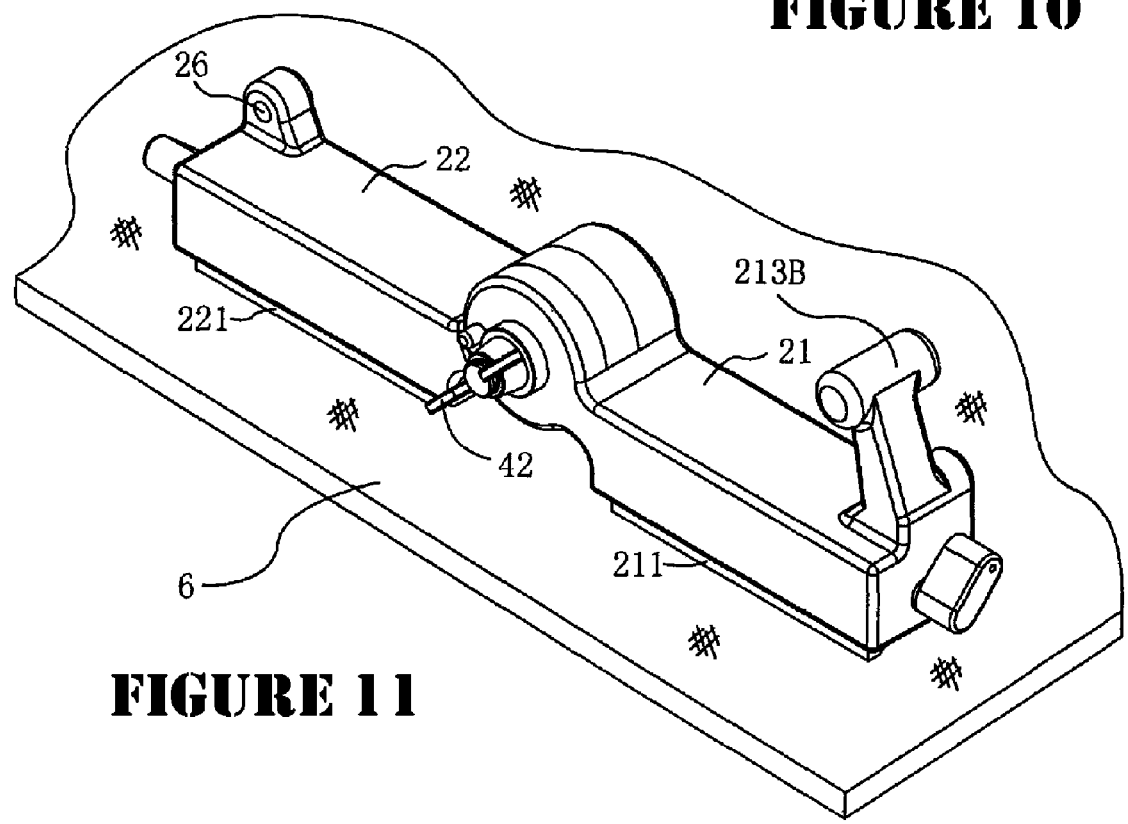
FIG. 11 shows an example of present invention being used on a work piece.

As shown in FIG. 11, an angle of 180 is selected to the magnetic positioning device of present invention, so that the magnetizable plates 221 and 211 of the magnetic arms 22 and 21 are attached to a work plate 6 on the same horizontal surface. Additionally, locking nut 42 can be tightened to the bolt 41 and insure that this selected angle will not be altered.

Although not shown in the figures, the same disclosure can be applied to an axle connector 4 wherein a second toothed-groove 223 is made to the connection disk 224, so that there can be two ranges of angle selection and the user can push two (2) sets of pins to go into any selected angle, as long as the enlarged head 551 is engaged to the selected indents 2231 on either of the toothed-groove, the re-adjustment of angle to frequently used angles can be done easily and efficiently.

The magnetic positioning device of present invention provides a fast and easy way to position magnetic work piece to angles that are frequently used in the industry. The angles, when selected, are then stably kept in place, as a result of the enlarged head 511 engaging to the indents 2231, producing a easy and low-cost result of angle clamp that is convenient and efficient to the users.

What is claimed is:

1. A magnetic positioning device, comprising:
   a. A first magnetic arm and a second magnetic arm connected by the respective first end of said arms;
   b. An adjustable-angle axle connector wherein two connection disks are formed at the first end of said first magnetic arm and one connection disk is formed at the first end of said second magnetic arm, so that a locking bolt and a corresponding locking nut are inserting through said connection disks concentrically when said disks are stacked together;
   c. An activation hole further exists on said connection disks, wherein an arc-shaped toothed-groove is formed on the connection disk of the second magnetic arm, allowing the magnetic arms to rotate about each other within the arc-angle of the toothed-groove, pivoting on the locking bolt; and,
   d. A pin with an enlarged head sized to fit the plurality of pre-determined angle position indents on the toothed-groove, with a spring located at the inner end of a hole on one of the connection disk, so that the spring provides a resilient force to disengage the enlarged head from the indents in the toothed-groove, when a different angle will be selected.

2. The magnetic position device of claim 1, further comprising:
   e. A pair of magnetizable plates inserted to said first magnetic arm in a parallel manner;
   f. A non-magnetizable aluminum sheath is built in-between said magnetizable plates to keep their relative position;
   g. A magnetic piece is rotatably in-laid to the inner part of said aluminum sheath, so that when it is turned, the direction of magnetic field of the plates can be changed; and,
   h. a switch built to the outside of the second end of said magnetic arm, whereby it controls the turning of said magnetic piece.

3. The magnetic positioning device of claim 1, wherein the toothed-groove has an arc-angle of 30-180 degrees.

4. The magnetic position device of claim 1, wherein there are preset indent positions on the toothed-groove that are set in the commonly used angles such as 30, 45, 60, 90, 120, 135, 150 and 180, or any other sets of desired angles.

5. The magnetic positioning device of claim 1 wherein degree indication markings are made to the external surfaces of said connection disks.

6. The magnetic positioning device of claim 1 wherein the second end of said first magnetic arm has a handle bar extending out.

7. The magnetic positioning device of claim 1, wherein additional auxiliary holes on the second end of said magnetic arms exist to assist the attachment of external tools or work pieces.

8. The magnetic positioning device of claim 1, wherein a second set of activation hole, arc-shaped toothed-groove and pin existed on the connection disks, enabling user a wider selection of angles as provided by such positioning device.

9. The magnetic positioning device of claim 2, wherein said magnetic piece inside said aluminum sheath consists of a center magnetic steel piece and two flanking non-magnetic round steel pieces.

* * * * *